(12) United States Patent
Ryuzaki et al.

(10) Patent No.: US 10,913,465 B2
(45) Date of Patent: Feb. 9, 2021

(54) SPEED CHANGING DEVICE

(71) Applicant: HONDA MOTOR CO., LTD., Tokyo (JP)

(72) Inventors: Tatsuya Ryuzaki, Wako (JP); Junya Ono, Wako (JP); Seiji Hamaoka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/961,941

(22) PCT Filed: Dec. 12, 2018

(86) PCT No.: PCT/JP2018/045643
§ 371 (c)(1),
(2) Date: Jul. 14, 2020

(87) PCT Pub. No.: WO2019/146297
PCT Pub. Date: Aug. 1, 2019

(65) Prior Publication Data
US 2020/0346661 A1    Nov. 5, 2020

(30) Foreign Application Priority Data

Jan. 25, 2018 (JP) ................. 2018-010468

(51) Int. Cl.
*B60W 50/14* (2020.01)
*B60W 10/06* (2006.01)
(Continued)

(52) U.S. Cl.
CPC ............ *B60W 50/14* (2013.01); *B60W 10/02* (2013.01); *B60W 10/06* (2013.01); *F16D 48/06* (2013.01);
(Continued)

(58) Field of Classification Search
CPC ...... B60W 50/14; B60W 10/02; B60W 10/06; B60W 2300/36; B60W 2520/10;
(Continued)

(56) References Cited

U.S. PATENT DOCUMENTS 9,776,637 B2 * 10/2017 Saitoh .................. B60W 30/18
2001/0040562 A1    11/2001 Masudaya
(Continued)

FOREIGN PATENT DOCUMENTS

| JP | 60-139948 | 9/1985 |
|---|---|---|
| JP | 2005-041359 | 2/2005 |

(Continued)

OTHER PUBLICATIONS

International Search Report and Written Opinion for International Application No. PCT/JP2018/045643 dated Mar. 5, 2019, 11 pages.

*Primary Examiner* — Huan Le
(74) *Attorney, Agent, or Firm* — Amin, Turocy & Watson, LLP

(57) ABSTRACT

A speed changing device includes a control unit (60) that: has a manual mode in which a clutch is engaged and disengaged by operating a clutch lever (4b) and an automatic mode in which the clutch is engaged and disengaged without the clutch lever (4b) being operated and is able to change a setting to the manual mode and the automatic mode; and is configured to signal mode misrecognition when it is determined that mode misrecognition has occurred.

6 Claims, 9 Drawing Sheets

(51) Int. Cl.
    *F16D 48/06*     (2006.01)
    *F16H 59/02*     (2006.01)
    *F16H 59/44*     (2006.01)
    *F16H 63/50*     (2006.01)
    *B60W 10/02*     (2006.01)
    *B62J 6/24*     (2020.01)

(52) U.S. Cl.
CPC ............. *F16H 59/02* (2013.01); *F16H 59/44* (2013.01); *F16H 63/50* (2013.01); *B60W 2300/36* (2013.01); *B60W 2520/10* (2013.01); *B60W 2710/021* (2013.01); *B60W 2710/0644* (2013.01); *B62J 6/24* (2020.02); *F16D 2500/106* (2013.01); *F16D 2500/10412* (2013.01); *F16D 2500/3108* (2013.01); *F16H 2059/0221* (2013.01)

(58) Field of Classification Search
CPC ..... B60W 2710/021; B60W 2710/0644; F16D 48/06; F16D 2500/10412; F16D 2500/106; F16D 2500/3108; F16H 59/02; F16H 59/44; F16H 2059/0221; F16H 63/50; B62J 6/24
See application file for complete search history.

(56) References Cited

U.S. PATENT DOCUMENTS

2011/0125377 A1\*    5/2011    Saitoh ................... F16H 59/044
                                                                                                  701/67
2014/0095033 A1\*    4/2014    Kojima ............... F16H 61/0204
                                                                                                  701/52

FOREIGN PATENT DOCUMENTS

| JP | 2013-106441 | 5/2013 |
| --- | --- | --- |
| JP | 2013-184689 | 9/2013 |
| JP | 2014-041450 | 3/2014 |
| JP | 2014-074424 | 4/2014 |
| JP | 2015-105865 | 6/2015 |
| JP | 2015-137697 | 7/2015 |

\* cited by examiner

FIG. 7

|  | CLUTCH-BY-WIRE SYSTEM ||
| | AUTOMATIC MODE | MANUAL MODE |
| --- | --- | --- |
| STARTING | AUTOMATIC STARTING<br>MANUAL STARTING<br>(ENGINE STOP AVOIDANCE) | MANUAL STARTING |
| SPEED CHANGING | SHIFTER + CLUTCH CONTROL<br>MANUAL SPEED CHANGING<br>(ENGINE STOP AVOIDANCE) | SHIFTER + CLUTCH CONTROL<br>MANUAL SPEED CHANGING |
| STOPPING | AUTOMATIC CLUTCH OFF<br>MANUAL CLUTCH OFF | MANUAL CLUTCH OFF |
| LEVER | USED<br>(WITH ENGINE STOP AVOIDANCE) | USED<br>(WITHOUT ENGINE STOP AVOIDANCE) |

SPEED CHANGING DEVICE

TECHNICAL FIELD

The present invention relates to a speed changing device.

Priority is claimed on Japanese Patent Application No. 2018-010468, filed Jan. 25, 2018, the content of which is incorporated herein by reference.

BACKGROUND ART

In the related art, a controller for a motorcycle in which an automatic mode and a manual mode are provided as a control mode for a transmission is disclosed (for example, see Patent Document 1).

The controller described in Patent Document 1 controls a transmission such that a gear ratio of the transmission reaches a gear ratio corresponding to an operating state of a vehicle in an automatic mode. In a manual mode, the controller controls the transmission in response to a speed changing request which is received from a speed changing operation member (for example, a shift switch, a shift pedal, and an accelerator grip).

That is, in Patent Document 1, switching between the automatic mode and the manual mode can be performed without a dedicated mode switch being operated by performing a predetermined operation on the speed changing operation member.

RELATED ART DOCUMENT

Patent Document

Patent Document 1: Japanese Unexamined Patent Application, First Publication No. 2014-74424

SUMMARY

Problems to be Solved by the Invention

In such a speed changing device which is used for a motorcycle or the like, a manual mode in which the motorcycle starts, stops, and changes speed by a clutch lever being operated and an automatic mode in which the motorcycle starts, stops, and changes speed without the clutch lever being operated are provided and it is possible to change a setting to the manual mode and the automatic mode. When the manual mode is set in the speed changing device, a clutch is electrically controlled and thus the motorcycle can start without the clutch lever being operated at the time of starting, but there is a likelihood that a rider will misrecognize that the automatic mode is set.

Therefore, an object of the invention is to allow a driver to be aware of mode misrecognition before starting in a speed changing device that can change a setting to a manual mode and an automatic mode.

Means for Solving the Problem

An aspect of the present invention employs the following configurations.

(1) A speed changing device according to an aspect of the invention includes a control unit (60) that: has a manual mode in which a clutch is engaged and disengaged by operating a clutch lever (4b) and an automatic mode in which the clutch is engaged and disengaged without the clutch lever (4b) being operated and is able to change a setting to the manual mode and the automatic mode; and is configured to signal mode misrecognition when it is determined that mode misrecognition has occurred.

(2) In the speed changing device according to the aspect of (1), the control unit (60) may signal mode misrecognition by stopping a vehicle (1).

(3) In the speed changing device according to the aspect of (1) or (2), the control unit (60) may signal mode misrecognition by issuing a signal for stopping an engine (13) of the vehicle (1).

(4) In the speed changing device according to the aspect of any one of (1) to (3), the control unit (60) may determine that mode misrecognition has occurred when a shift operation is performed without the clutch lever (4b) being operated in a state in which the manual mode is set.

(5) In the speed changing device according to the aspect of (4), the control unit (60) may determine that mode misrecognition has occurred only when it is determined that a vehicle speed is equal to or lower than a predetermined value.

(6) In the speed changing device according to the aspect of any one of (1) to (5), the control unit (60) may signal mode misrecognition using another means other than stopping the vehicle (1) when it is repeatedly determined that mode misrecognition has occurred.

(7) In the speed changing device according to the aspect of (6), the other means may be a means that is configured to change a blinking cycle of an indicator.

Advantage of the Invention

With the speed changing device according to the aspect of (1) of the invention, since the control unit that notifies of mode misrecognition when mode misrecognition has occurred is provided, the following advantages are achieved. Since mode misrecognition can be actively notified of even in a state in which a driver does not recognize a current mode, it is possible to allow a driver to recognize mode misrecognition before starting.

With the speed changing device according to the aspect of (2) of the invention, since the control unit notifies the driver of mode misrecognition by stopping the vehicle, it is possible to allow a driver to more reliably recognize that mode misrecognition has occurred. Since an operation of stopping the vehicle is performed under the control, it is possible to reduce a shock at the time of stopping in comparison with a case in which the operation of stopping the vehicle is performed mechanically.

With the speed changing device according to the aspect of (3) of the invention, since the control unit notifies of mode misrecognition by issuing a signal for stopping the engine of the vehicle, it is possible to allow a driver to more reliably recognize that mode misrecognition has occurred.

With the speed changing device according to the aspect of (4) of the invention, since the control unit determines that mode misrecognition has occurred when the shift operation is performed without the clutch lever being operated in a state in which the manual mode is set, the following advantages are achieved. Since a driver can recognize mode misrecognition when the manual mode is set, it is possible to avoid an erroneous operation when the manual mode is set.

With the speed changing device according to the aspect of (5) of the invention, since the control unit determines that mode misrecognition has occurred only when it is determined that the vehicle speed is equal to or lower than the predetermined value, the time at which a driver is allowed to recognize mode misrecognition can be limited to a time at which it is determined that the vehicle speed is equal to or lower than the predetermined value.

With the speed changing device according to the aspect of (6) of the invention, since the control unit is configured to signal mode misrecognition using a means other than stopping the vehicle when it is repeatedly determined that mode misrecognition has occurred, it is possible to allow a driver to recognize mode misrecognition even at the time of stopping of the vehicle.

With the speed changing device according to the aspect of (7) of the invention, since the other means includes changing the blinking cycle of the indicator, the following advantages are achieved. By allowing a driver to recognize change of the blinking cycle of the indicator, it is possible to allow the driver to more reliably recognize that mode misrecognition has occurred.

BRIEF DESCRIPTION OF THE DRAWINGS

FIG. 7 is a diagram showing an example of a control mode of a clutch-by-wire system.

DESCRIPTION OF THE EMBODIMENTS

Figure 1:
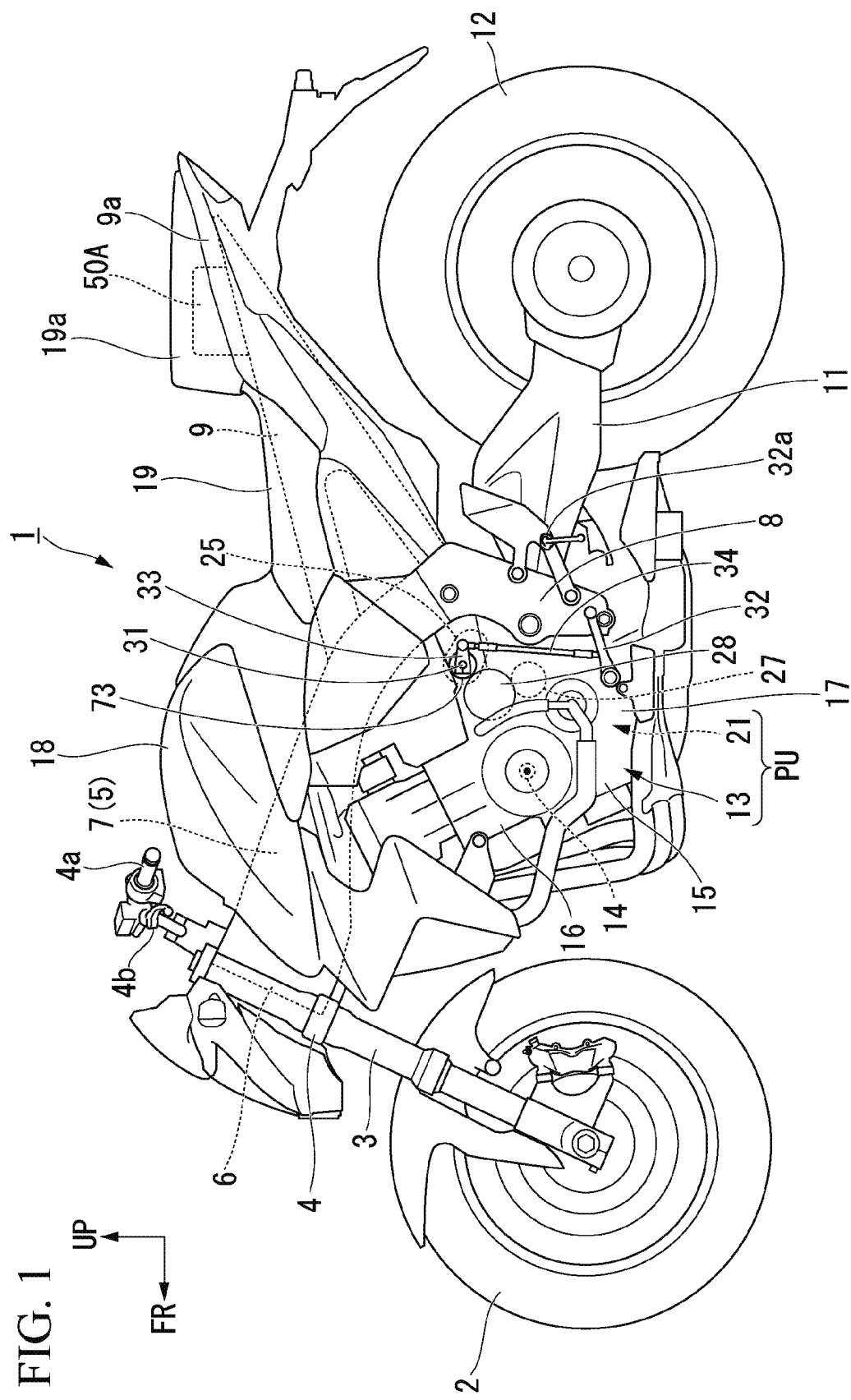
FIG. 1 is a left side view of a motorcycle according to an embodiment.

Hereinafter, an embodiment of the present invention will be described with reference to the accompanying drawings. In the following description, it is assumed that the directions of forward, rearward, right, left, and the like are the same as directions in a vehicle which will be described below unless otherwise mentioned. In the drawings which are used for the following description, an arrow FR indicating the front side of the vehicle, an arrow LH indicating the left side of the vehicle, and an arrow UP indicating the upper side of the vehicle are shown at appropriate positions.

<Entire Configuration of Vehicle>

As shown in FIG. 1, this embodiment is applied to a motorcycle 1 which is a straddle type vehicle. A front wheel 2 of the motorcycle 1 is supported by lower ends of a pair of front forks 3.

Upper parts of the right and left front forks 3 are supported by a head pipe 6 of a front end of a vehicle framework 5 via a steering stem 4. A steering handlebar 4a is attached to a top bridge of the steering stem 4.

The vehicle framework 5 includes a head pipe 6, a main tube 7 that extends downward and rearward at the center in a vehicle width direction (a lateral direction) from the head pipe 6, right and left pivot frames 8 that extend downward from a rear end of the main tube 7, and a seat frame 9 that extends rearward from the main tube 7 and the right and left pivot frames 8. Front ends of swing arms 11 are pivotally supported by the right and left pivot frames 8. A rear wheel 12 of the motorcycle 1 is supported by rear ends of the swing arms 11.

A fuel tank 18 is supported on the right and left main tubes 7. A front seat 19 and a rear seat cover 19a are longitudinally arranged and supported on the seat frame 9 behind the fuel tank 18. The seat frame 9 is surrounded with a rear cowl 9a.

A power unit PU which is a motor of the motorcycle 1 is suspended below the right and left main tubes 7. For example, the power unit PU is linked to the rear wheel 12 via a chain type transmission mechanism.

The power unit PU includes an engine (an internal combustion engine) 13 which is located on the front side thereof and a transmission 21 which is located on the rear side thereof as a unified body. For example, the engine 13 is a multi-cylinder engine in which a rotation shaft of a crank shaft 14 (hereinafter also referred to as a "crankshaft 14") is disposed to be parallel to the lateral direction (the vehicle width direction). In the engine 13, cylinders 16 rise up in the front of a crank case 15. The rear part of the crank case 15 is a transmission case 17 in which the transmission 21 is accommodated.

<Transmission>

Figure 2:
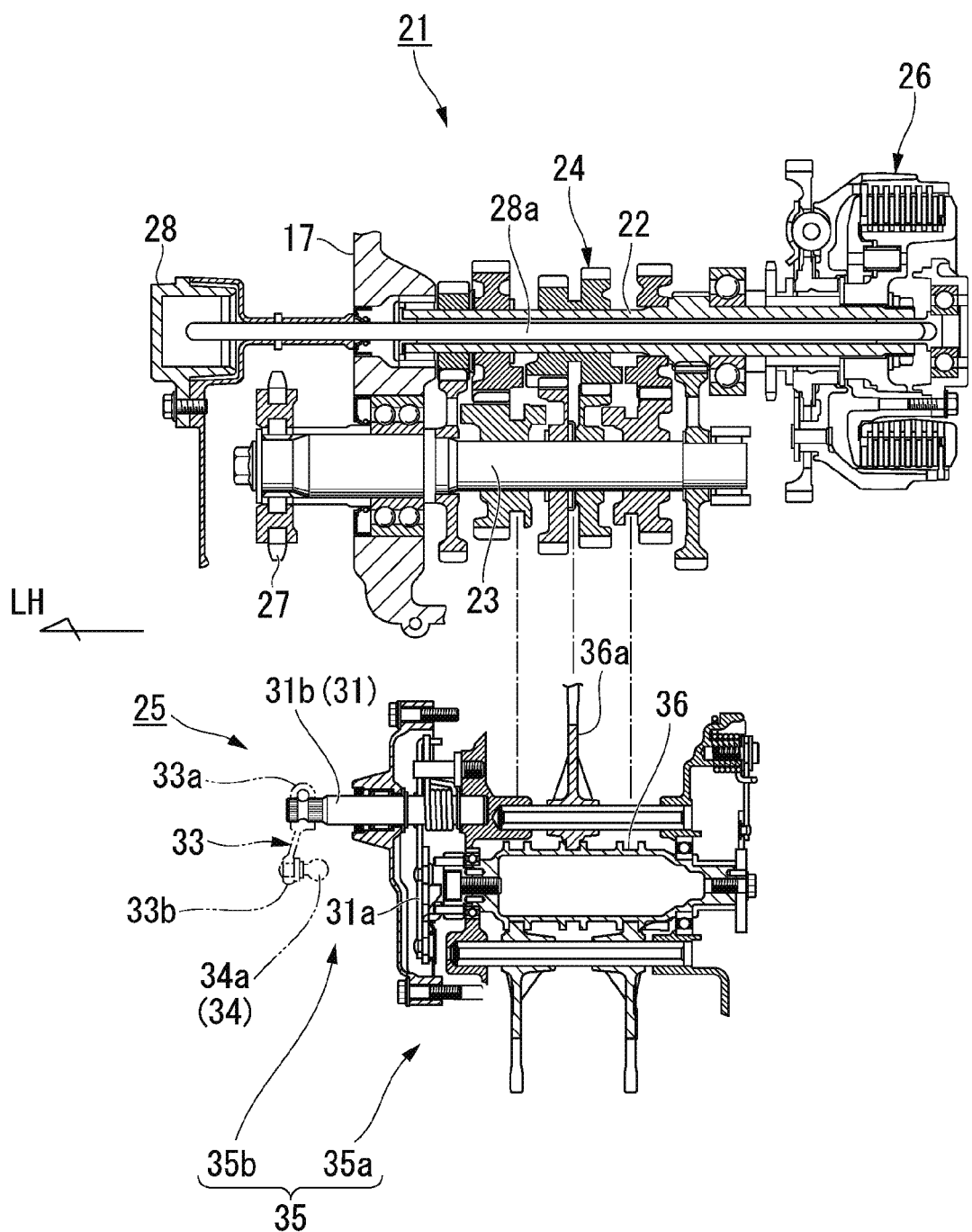
FIG. 2 is a sectional view of a transmission and a change mechanism of the motorcycle.

As shown in FIG. 2, the transmission 21 is a stepped transmission including a main shaft 22, a counter shaft 23, and a speed-change gear group 24 that is suspended between the two shafts 22 and 23. The counter shaft 23 (hereinafter also referred to as a "countershaft 23") constitutes an output shaft of the transmission 21 (the power unit PU shown in FIG. 1). An end of the counter shaft 23 protrudes leftward from the rear part of the crank case 15 and is connected to the rear wheel 12 via the chain type transmission mechanism.

The speed-change gear group 24 includes gears corresponding to the number of gear stages which are supported by the two shafts 22 and 23. The transmission 21 is of a normally engaged type in which corresponding gear pairs of the speed-change gear group 24 are normally engaged between the two shafts 22 and 23. A plurality of gears supported by the two shafts 22 and 23 are classified into a free gear which is rotatable relative to the corresponding shaft and a slide gear (a shifter) which is spline-fitted to the corresponding shaft. A dog which is convex in the axial direction is provided in one of the free gear and the slide gear and a slot which is concave in the axial direction is provided in the other such that it can engage with the dog. That is, the transmission 21 is a so-called dog-clutch transmission.

Figure 3:
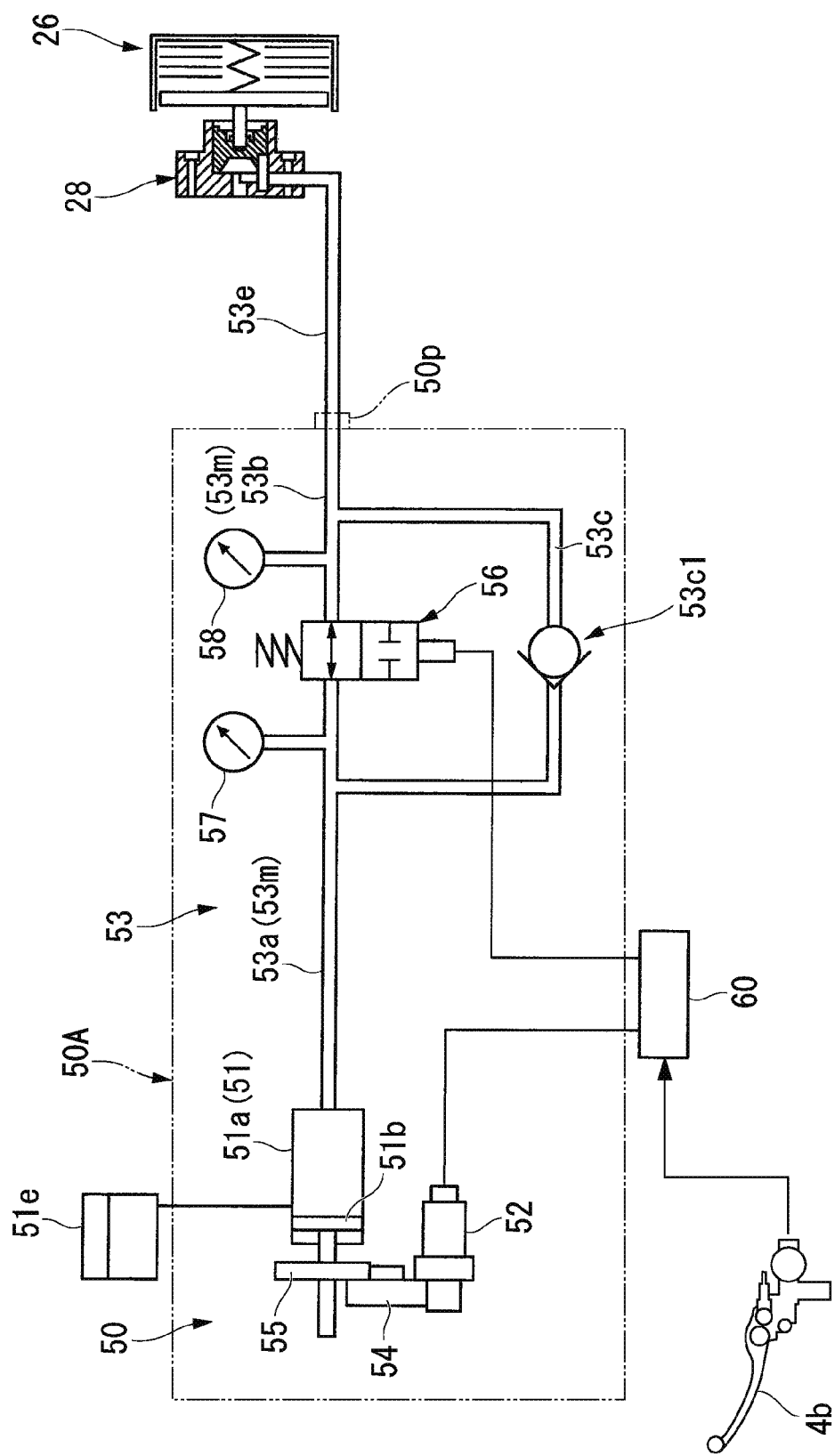
FIG. 3 is a diagram schematically showing a clutch operation system including a clutch actuator.

The main shaft 22 and the counter shaft 23 of the transmission 21 are longitudinally arranged behind the crank shaft 14 (see FIG. 1). Referring to FIG. 3, a clutch device 26 that is operated by a clutch actuator 50 is coaxially disposed at the right end of the main shaft 22 (see FIG. 2). For example, the clutch device 26 is a multi-disc wet clutch and is a so-called normally open clutch. The clutch device 26 is switched to an engaged state in which power transmission is possible with supply of a hydraulic pressure from the clutch actuator 50. The clutch device 26 is returned to a disengaged state in which power transmission is not possible when supply of a hydraulic pressure from the clutch actuator 50 is cut off.

Referring to FIG. 2, a rotational force of the crank shaft 14 (see FIG. 1) is transmitted to the main shaft 22 via the clutch device 26 and is transmitted from the main shaft 22 to the counter shaft 23 via an arbitrary gear pair of the speed-change gear group 24. A drive sprocket 27 of the chain type transmission mechanism is attached to the left end protruding leftward from the rear part of the crank case 15 (see FIG. 1) in the counter shaft 23.

A change mechanism 25 that switches gear pairs of the speed-change gear group 24 is accommodated in the rear-upper part of the transmission 21. The change mechanism 25 operates a plurality of shift forks 36a according to a pattern of lead grooves formed on an outer circumference with rotation of a hollow cylindrical shift drum 36 which is parallel to the two shafts 22 and 23. Accordingly, the gear pair which is used for power transmission between the two shafts 22 and 23 in the speed-change gear group 24 is switched.

The change mechanism 25 includes a shift spindle 31 which is parallel to the shift drum 36.

In the change mechanism 25, a shift arm 31a fixed to the shift spindle 31 rotates the shift drum 36 at the time of rotation of the shift spindle 31. Accordingly, the shift forks 36a move in the axial direction according to the pattern of lead grooves to switch the gear pair in which power transmission is possible in the speed-change gear group 24 (that is, the gear stage is switched).

In the shift spindle 31, an outer shaft portion 31b protrudes outward (left side) in the vehicle width direction of the crank case 15 such that the change mechanism 25 can be operated. A shift load sensor 73 (a shift operation detecting means) is coaxially attached to the outer shaft portion 31b of the shift spindle 31 (see FIG. 1). A swing lever 33 is attached to the outer shaft portion 31b of the shift spindle 31 (or the rotation shaft of the shift load sensor 73). The swing lever 33 extends rearward from a base end 33a which is clamp-fixed to the shift spindle 31 (or the rotation shaft). An upper end of a link rod 34 is swingably connected to a distal end 33b of the swing lever 33 via an upper ball joint 34a. A lower end of the link rod 34 is swingably connected to a shift pedal 32 (see FIG. 1) which is operated with a driver's leg via a lower ball joint (not shown).

As shown in FIG. 1, a front end of the shift pedal 32 is vertically swingably supported by the lower portion of the crank case 15 via a shaft which is parallel to the lateral direction. A pedal portion on which a driver's foot tip placed on a step 32a is located is provided at the rear end of the shift pedal 32. The lower end of the link rod 34 is connected to an intermediate portion in the longitudinal direction of the shift pedal 32.

As shown in FIG. 2, a shift change device 35 that switches of the gear stage of the transmission 21 is configured to include the shift pedal 32 (see FIG. 1), the link rod 34, and the change mechanism 25. In the shift change device 35, an assembly (the shift drum 36, the shift forks 36a, and the like) that switches the gear stage of the transmission 21 in the transmission case 17 is referred to as a speed changing operation unit 35a. An assembly (the shift spindle 31, the shift arm 31a, and the like) that receives a speed changing operation on the shift pedal 32, rotates around the axis of the shift spindle 31, and transmits this rotation to the speed changing operation unit 35a is referred to as a speed changing operation receiving unit 35b.

Here, the motorcycle 1 employs a so-called semi-automatic speed changing system (an automatic clutch type speed changing system) in which a driver performs only a speed changing operation of the transmission 21 (a foot's operation of the shift pedal 32) and an engaging and disengaging operation of the clutch device 26 is automatically performed by electrical control based on the operation of the shift pedal 32.

<Speed Changing System (Speed Changing Device)>

Figure 4:
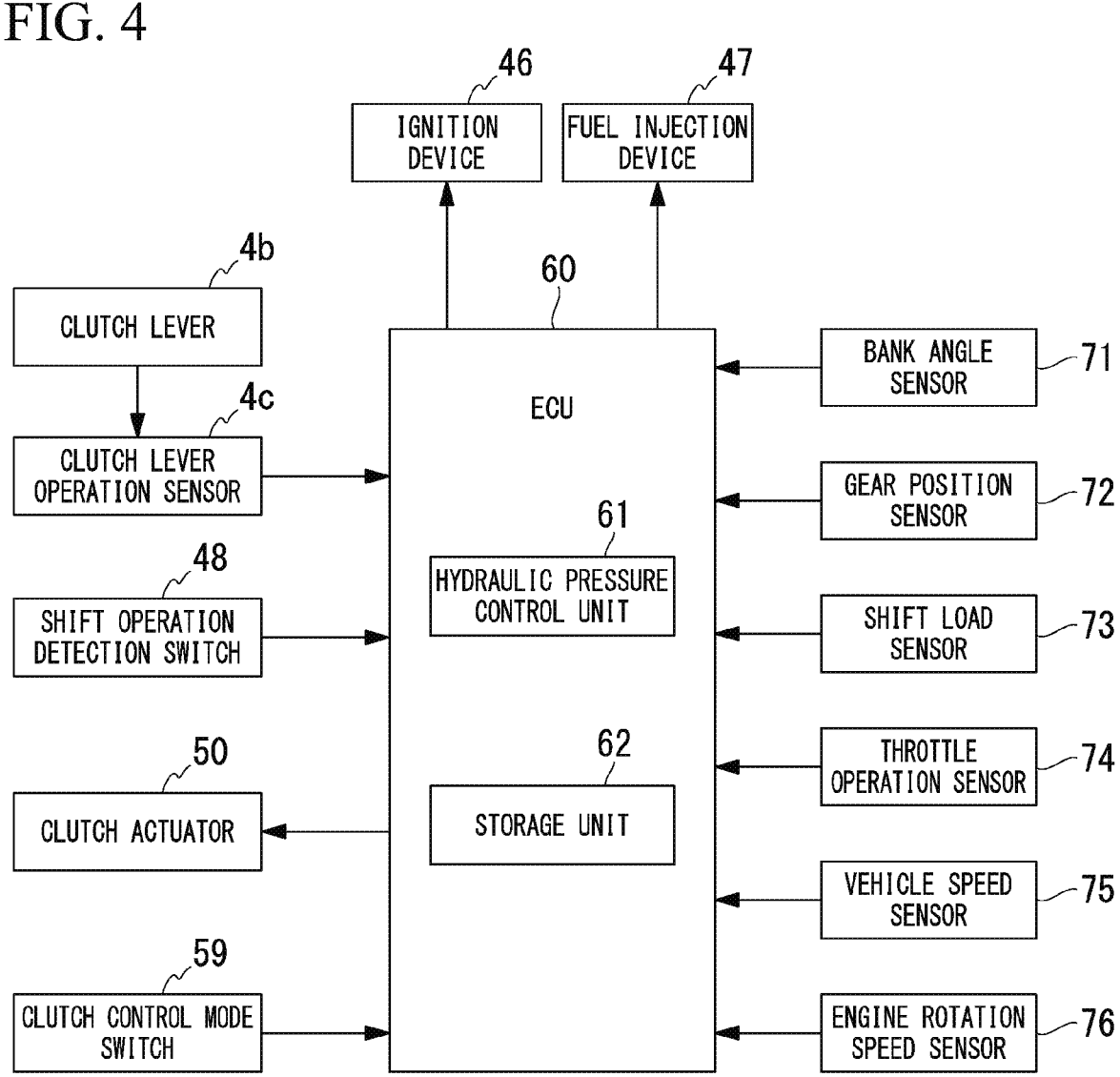
FIG. 4 is a block diagram showing a speed changing system.

As shown in FIG. 4, the speed changing system includes a clutch actuator 50, an electronic control unit (ECU: controller) 60, and various sensors 71 to 76.

The ECU 60 is supplied with detection information from a bank angle sensor 71 that detects a bank angle of the vehicle body, a gear position sensor 72 that detects a gear stage on the basis of the rotational angle of the shift drum 36, and a shift load sensor 73 (for example, a torque sensor) that detects an operation torque input to the shift spindle 31 and various types of vehicle state detection information from a throttle operation sensor 74 that detects a throttle opening amount, a vehicle speed sensor 75, an engine rotation speed sensor 76 that detects an engine rotation speed, and the like. The ECU 60 controls the operation of the clutch actuator 50 on the basis of various types of vehicle state detection information and controls the operations of an ignition device 46 and a fuel injection device 47. The ECU 60 is also supplied with detection information from hydraulic pressure sensors 57 and 58 (see FIG. 3) and a shift operation detecting switch (a shift neutral switch) 48.

The ECU 60 includes a hydraulic pressure control unit (a clutch control unit) 61 and a storage unit 62.

Referring together to FIG. 3, the clutch actuator 50 can control a liquid pressure for engaging and disengaging the clutch device 26 by causing the ECU 60 to control the operation thereof. The clutch actuator 50 includes an electric motor 52 (hereinafter simply referred to as a "motor 52") which is a drive source and a master cylinder 51 that is driven by the motor 52. The clutch actuator 50 constitutes a unified clutch control unit 50A along with a hydraulic circuit device 53 which is provided between the master cylinder 51 and a hydraulic pressure supply/discharge port 50p.

The ECU 60 calculates a target value of a hydraulic pressure (a target hydraulic pressure) which is supplied to a slave cylinder 28 to engage or disengage the clutch device 26 on the basis of a preset calculation program. The ECU 60 controls the clutch control unit 50A such that a hydraulic pressure (a slave hydraulic pressure) on the slave cylinder 28 side which is detected by a downstream hydraulic pressure sensor 58 approaches the target hydraulic pressure.

The master cylinder 51 causes a piston 51b of a cylinder body 51a to stroke by driving the motor 52 such that a working oil in the cylinder body 51a can be supplied to or discharged from the slave cylinder 28. Reference numeral 55 in the drawing denotes a conversion mechanism which is a ball screw mechanism, reference numeral 54 denotes a transmission mechanism which is suspended between the motor 52 and the conversion mechanism 55, and reference numeral 51e denotes a reservoir that is connected to the master cylinder 51.

The hydraulic circuit device 53 includes a valve mechanism (a solenoid valve 56) that opens or closes an intermediate portion of a main oil passage 53m (a hydraulic pressure supply/discharge oil passage) extending from the master cylinder 51 to the clutch device 26 side (the slave cylinder 28 side). The main oil passage 53m of the hydraulic circuit device 53 is partitioned into an upstream oil passage 53a which is closer to the master cylinder 51 than the solenoid valve 56 and a downstream oil passage 53b which is closer to the slave cylinder 28 than the solenoid valve 56. The hydraulic circuit device 53 further includes a bypass oil passage 53c that communicates with the upstream oil passage 53a and the downstream oil passage 53b by bypassing the solenoid valve 56.

The solenoid valve 56 is a so-called normally open valve. A one-way valve 53c1 that causes a working oil to flow only in a direction from upstream to downstream is provided in the bypass oil passage 53c. An upstream hydraulic pressure sensor 57 that detects a hydraulic pressure of the upstream oil passage 53a is provided upstream from the solenoid valve 56. A downstream hydraulic pressure sensor 58 that detects a hydraulic pressure of the downstream oil passage 53b is provided downstream from the solenoid valve 56.

As shown in FIG. 1, for example, the clutch control unit 50A is accommodated in the rear cowl 9a. The slave cylinder 28 is attached to the rear left part of the crank case 15. The clutch control unit 50A and the slave cylinder 28 are connected to each other via a hydraulic pressure pipe 53e (see FIG. 3).

As shown in FIG. 2, the slave cylinder 28 is coaxially disposed on the left side of the main shaft 22. The slave cylinder 28 presses a push rod 28a penetrating the main shaft 22 to the right at the time of supply of a hydraulic pressure from the clutch actuator 50 (see FIG. 3). The slave cylinder 28 causes the clutch device 26 to operate in the engaged state via the push rod 28a by pressing the push rod 28a to the right. The slave cylinder 28 releases the pressing of the push rod 28a and returns the clutch device 26 to the disengaged state when the supply of the hydraulic pressure is stopped.

When it is intended to maintain the clutch device 26 in the engaged state, it is necessary to continuously supply the hydraulic pressure and electric power is consumed by as much. Therefore, as shown in FIG. 3, the solenoid valve 56 is provided in the hydraulic circuit device 53 of the clutch control unit 50A and the solenoid valve 56 is closed after a hydraulic pressure has been supplied to the clutch device 26. Accordingly, by employing a configuration in which the hydraulic pressure supplied to the clutch device 26 is maintained and the hydraulic pressure is supplemented by the decrease in pressure (is recharged by the leakage), energy consumption is curbed.

<Clutch Control>

The operation of a clutch control system will be described below with reference to the graph shown in FIG. 5. In the graph shown in FIG. 5, the vertical axis represents a supplied hydraulic pressure which is detected by the downstream hydraulic pressure sensor 58 and the horizontal axis represents the elapsed time.

When the motorcycle 1 is stopped (idles), the solenoid valve 56 which is controlled by the ECU 60 is in an open state. At this time, the slave cylinder 28 side (the downstream side) is in a low-pressure state which is lower than a touch-point hydraulic pressure TP, and the clutch device 26 is in a non-engaged state (a disengaged state, an open state). This state corresponds to area A in FIG. 5.

In a state in which the vehicle stops in an in-gear state, electric power is supplied to the motor 52 and a slight hydraulic pressure is generated. This is to allow the vehicle to be started immediately with the clutch maintained as it is.

When the rotation speed of the engine 13 increases at the time of starting of the motorcycle 1, electric power is supplied to only the motor 52 and a hydraulic pressure is supplied from the master cylinder 51 to the slave cylinder 28 via the solenoid valve 56 which is open. When the hydraulic pressure on the slave cylinder 28 side (the downstream side) increases to be equal to or greater than the touch-point hydraulic pressure TP, engagement of the clutch device 26 is started and the clutch device 26 is changed to a semi-clutched state in which transmission of some power is possible. Accordingly, the motorcycle 1 can be smoothly started. This state corresponds to area B in FIG. 5.

When a difference between input rotation and output rotation of the clutch device 26 decreases and the hydraulic pressure on the slave cylinder 28 side (the downstream side) reaches a lower-limit retention hydraulic pressure LP, engagement of the clutch device 26 transitions to a locked state and all the drive force of the engine 13 is transmitted to the transmission 21. This state corresponds to area C in FIG. 5.

When a hydraulic pressure is supplied from the master cylinder 51 side to the slave cylinder 28, the solenoid valve 56 is switched to an open state and the master cylinder 51 is pressurized by supplying electric power to the motor 52 to drive the motor 52 in a forward rotating direction. Accordingly, a hydraulic pressure on the slave cylinder 28 side is adjusted to a clutch-engagement hydraulic pressure. At this time, the operation of the clutch actuator 50 is controlled in a feedback manner on the basis of a hydraulic pressure detected by the downstream hydraulic pressure sensor 58.

When the hydraulic pressure on the slave cylinder 28 side (the downstream side) reaches an upper-limit retention hydraulic pressure HP, electric power is supplied to the solenoid valve 56 such that the solenoid valve 56 closes, supply of electric power to the motor 52 is stopped, and generation of a hydraulic pressure is stopped. That is, the upstream side decreases in hydraulic pressure and reaches a low-pressure state, and the downstream side is maintained in a high-pressure state (the upper-limit retention hydraulic pressure HP). Accordingly, without causing the master cylinder 51 to generate a hydraulic pressure, the clutch device 26 is maintained in the engaged state and the motorcycle 1 is enabled to travel, thereby curbing power consumption.

Depending on the speed changing operation, speed changing may be performed immediately after the clutch device 26 is charged with a hydraulic pressure. In this case, before the solenoid valve 56 operates to be closed and the upstream side is brought into a low-pressure state, the motor 52 is driven in a reverse rotating direction with the solenoid valve 56 kept open. Accordingly, the master cylinder 51 is decompressed, the reservoir 51e is made to be communicating, and the hydraulic pressure on the clutch device 26 side is released to the master cylinder 51. At this time, the operation of the clutch actuator 50 is controlled in a feedback manner on the basis of the hydraulic pressure detected by the upstream hydraulic pressure sensor 57.

Figure 5:
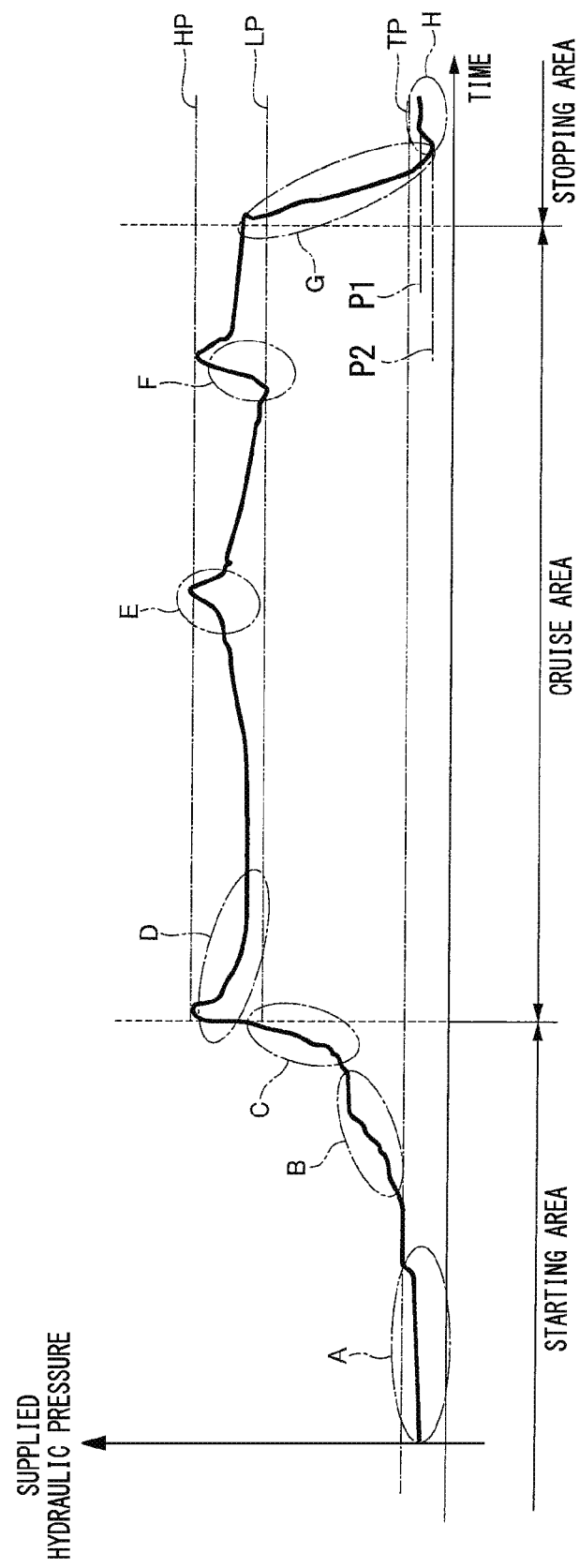
FIG. 5 is a graph showing change of a supplied hydraulic pressure of the clutch actuator.

In a state in which the solenoid valve 56 is closed and the clutch device 26 is maintained in the engaged state, the hydraulic pressure on the downstream side decreases (leaks) gradually as indicated by area D in FIG. 5. That is, the hydraulic pressure on the downstream side decreases gradually due to reasons such as leakage of a hydraulic pressure based on deformation of a seal of the solenoid valve 56 and the one-way valve 53c1 or a decrease in temperature.

On the other hand, as in area E in FIG. 5, the hydraulic pressure on the downstream side may increase due to an increase in temperature or the like. When the hydraulic pressure on the downstream side fluctuates minutely, the minute change can be absorbed by an accumulator which is not shown. Accordingly, when the hydraulic pressure fluctuates, power consumption is not increased by operating the motor 52 and the solenoid valve 56.

When the hydraulic pressure on the downstream side increases to the upper-limit retention hydraulic pressure HP as in area E in FIG. 5, a countermeasure of decreasing supply of electric power to the solenoid valve 56 or the like is performed. Accordingly, the solenoid valve 56 is gradually opened and the hydraulic pressure on the downstream side is released to the upstream side.

When the hydraulic pressure on the downstream side decreases to the lower-limit retention hydraulic pressure LP as in area F in FIG. 5, supply of electric power to the motor 52 is started in a state in which the solenoid valve 56 is closed, and the hydraulic pressure on the upstream side is increased. When the hydraulic pressure on the upstream side is higher than the hydraulic pressure on the downstream side, this hydraulic pressure is supplied (recharged) to the downstream side via the bypass oil passage 53c and the one-way valve 53c1. When the hydraulic pressure on the downstream side reaches the upper-limit retention hydraulic pressure HP, supply of electric power to the motor 52 is stopped to stop generation of a hydraulic pressure. Accordingly, the hydraulic pressure on the downstream side is maintained between the upper-limit retention hydraulic pressure HP and the lower-limit retention hydraulic pressure LP, and the clutch device 26 is maintained in the engaged state.

When the transmission 21 becomes neutral at the time of stopping of the motorcycle 1, supply of electric power to both the motor 52 and the solenoid valve 56 is stopped. Accordingly, the master cylinder 51 stops generation of a hydraulic pressure and stops supply of a hydraulic pressure to the slave cylinder 28. The solenoid valve 56 becomes open and the hydraulic pressure in the downstream oil passage 53b is returned to the reservoir 51e. As a result, the slave cylinder 28 side (the downstream side) reaches a lower hydraulic pressure than the touch-point hydraulic pressure TP and the clutch device 26 is switched to the disengaged state. This state corresponds to areas G and H in FIG. 5.

In the state in which the transmission 21 is in the neutral state at the time of stopping of the motorcycle 1, supply of electric power to the motor 52 is cut off and the motor is stopped. Accordingly, the hydraulic pressure becomes close to zero.

On the other hand, when the transmission 21 is maintained in an in-gear state at the time of stopping of the motorcycle 1, a standby state in which a standby hydraulic pressure WP is applied to the slave cylinder 28 side is started.

The standby hydraulic pressure WP is a hydraulic pressure which is slightly lower than the touch-point hydraulic pressure TP at which engagement of the clutch device 26 is started, and is a hydraulic pressure in which the clutch device 26 has not been engaged yet (the hydraulic pressure which is applied in areas A and H in FIG. 5). By applying the standby hydraulic pressure WP, invalid engagement of the clutch device 26 (backlash of the elements, cancellation of an operative reaction force, application of a preload to a hydraulic oil passage, and the like) becomes possible. Accordingly, operation responsiveness at the time of engagement of the clutch device 26 is improved.

<Speed Change Control>

Speed change control of the motorcycle 1 will be described below.

The motorcycle 1 according to this embodiment performs control for decreasing the standby hydraulic pressure WP which is supplied to the slave cylinder 28 when a shift operation from a first gear stage to a neutral stage is performed on the shift pedal 32 in an in-gear stopped state in which a gear position of the transmission 21 is in an in-gear state of a first gear stage and a vehicle speed is lower than a set value corresponding to a stopped state.

When the motorcycle 1 is stopped and the gear position of the transmission 21 is located in a gear stage other than the neutral stage, that is, when the transmission 21 is an in-gear stopped state, a preset standby hydraulic pressure WP is supplied to the slave cylinder 28.

The standby hydraulic pressure WP is set to a first set value P1 (see FIG. 5) which is a standard standby hydraulic pressure in a normal state (in a non-detected state in which a speed changing operation of the shift pedal 32 is not detected). Accordingly, the clutch device 26 is in a standby state in which invalid engagement is performed and responsiveness at the time of clutch engagement is improved. That is, when a driver increases a throttle opening amount to increase the rotation speed of the engine 13, engagement of the clutch device 26 is started immediately by supply of a hydraulic pressure to the slave cylinder 28 and quick starting and acceleration of the motorcycle 1 become possible.

The motorcycle 1 includes a shift operation detecting switch 48 separately from the shift load sensor 73 in order to detect a driver's shift operation of the shift pedal 32 (see FIG. 4).

When the shift operation detecting switch 48 detects a shift operation from the first gear stage to the neutral stage in the in-gear stopped state, a hydraulic pressure control unit 61 performs control for setting the standby hydraulic pressure WP to a second set value P2 (a low standby hydraulic pressure, see FIG. 5) which is lower than the first set value P1 before a speed changing operation is performed.

When the transmission 21 is in the in-gear state, the standard standby hydraulic pressure corresponding to the first set value P1 is supplied to the slave cylinder 28 in the normal state and thus a slight so-called drag is generated in the clutch device 26. At this time, the dog and the slot (a dog hole) engaging with each other in the dog clutch of the transmission 21 may press each other in the rotating direction and resistance of disengagement may be caused to make the shift operation heavier. In this case, when the standby hydraulic pressure WP which is supplied to the slave cylinder 28 is decreased to a low standby hydraulic pressure corresponding to the second set value P2, the dog and the slot are more easily disengaged to lighten the shift operation.

<Clutch Control Mode>

Figure 6:
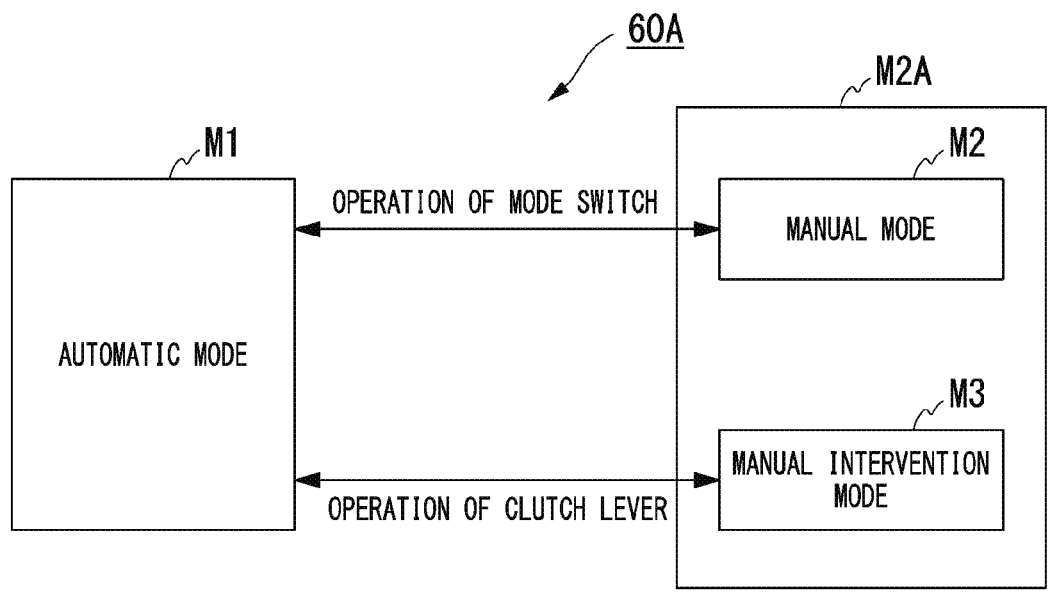
FIG. 6 is a diagram showing switching of a clutch control mode according to the embodiment.

As shown in FIG. 6, a clutch control device 60A according to this embodiment includes three types of clutch control modes. The clutch control mode is appropriately switched between three types of modes including an automatic mode M1 in which automatic control is performed, a manual mode M2 in which a manual operation is performed, and a manual intervention mode M3 in which the manual operation is temporarily performed in response to the operations of a clutch control mode switch 59 (see FIG. 4) and a clutch lever 4b (see FIG. 1). Objects including the manual mode M2 and the manual intervention mode M3 constitute a manual system M2A.

The automatic mode M1 is a mode in which a clutch capacity suitable for a traveling state is calculated and the clutch device 26 is controlled by automatic starting and speed changing control. The manual mode M2 is a mode in which the clutch capacity is calculated and the clutch device 26 is controlled in response to a clutch operation instruction from an occupant. The manual intervention mode M3 is a temporary manual operation mode in which the clutch operation instruction from an occupant is received in the automatic mode M1, the clutch capacity is calculated from the clutch operation instruction, and the clutch device 26 is controlled. When the occupant stops the operation of the clutch lever 4b in the manual intervention mode M3 (when the clutch lever is completely released), the clutch control mode is set to return to the automatic mode M1.

The clutch control device 60A according to this embodiment drives the clutch actuator 50 (see FIG. 3) to generate a clutch-control hydraulic pressure. Accordingly, the clutch control device 60A starts control in a clutch-off state (a disengaged state) in the automatic mode M1 at the time of system start. Since the clutch operation is not necessary at the time of stopping of the engine 13, the clutch control device 60A is set to return to the clutch-off state in the automatic mode M1.

In the embodiment, the clutch control device 60A constitutes a clutch control system along with the clutch lever 4b.

In the automatic mode M1, clutch control is basically automatically performed and the motorcycle 1 can be made to travel without the lever being operated. In the automatic mode M1, the clutch capacity is controlled on the basis of the throttle opening amount, the engine rotation speed, the vehicle speed, and the shift sensor output. Accordingly, the motorcycle 1 can start without stopping the engine simply with a throttle operation and can change a speed simply with a shift operation. At the time of a very low speed corresponding to idling, the clutch device 26 may be automatically disengaged. In the automatic mode M1, the manual intervention mode M3 is started by grasping the clutch lever 4b, and the clutch device 26 can be arbitrarily disengaged.

On the other hand, in the manual mode M2, the clutch capacity is controlled by an occupant's lever operation. The automatic mode M1 and the manual mode M2 can be switched therebetween by operating the clutch control mode switch 59 (see FIG. 4) during stopping. The clutch control device 60A may include an indicator indicating that the lever operation is valid at the time of transition to the manual system M2A (the manual mode M2 or the manual intervention mode M3).

In the manual mode M2, clutch control is basically manually performed and the clutch hydraulic pressure can be controlled on the basis of an operation angle of the clutch lever 4b. Accordingly, engagement and disengagement of the clutch device 26 can be controlled according to an occupant's intention, and the clutch device 26 can be engaged for traveling even at a very low speed corresponding to idling. The engine may be stopped depending on a lever operation, and automatic starting simply with a throttle operation is not possible. In the manual mode M2, automatic clutch control intervention is also performed at the time of the shift operation.

In the automatic mode M1, engagement and disengagement of the clutch device 26 are automatically performed by the clutch actuator 50. In the automatic mode M1, a manual operation may be temporarily intervened in automatic control of the clutch device 26 by performing a manual clutch operation on the clutch lever 4b (the manual intervention mode M3).

<Manual Clutch Operation>

As shown in FIG. 1, the clutch lever 4b which is a manual clutch operator is attached to a base end of a left grip (inside in the vehicle width direction) of the steering handlebar 4a. The clutch lever 4b serves as an operator that issues a clutch operating request signal to the ECU 60 without mechanical connection to the clutch device 26 using a cable, a hydraulic pressure, or the like. That is, the motorcycle 1 employs a clutch-by-wire system in which the clutch lever 4b and the clutch device 26 are electrically connected to each other.

Referring together to FIG. 4, a clutch lever operation sensor 4c that detects an amount of operation (a rotational angle) of the clutch lever 4b is integrally provided in the clutch lever 4b. The clutch lever operation sensor 4c converts an amount of operation of the clutch lever 4b to an electrical signal and outputs the electrical signal.

In a state in which the operation of the clutch lever 4b is valid (the manual system M2A), the ECU 60 drives the clutch actuator 50 on the basis of the output of the clutch lever operation sensor 4c. The clutch lever 4b and the clutch lever operation sensor 4c may be integrated with or separated from each other.

The motorcycle 1 includes the clutch control mode switch 59 that switches the control mode of the clutch operation. The clutch control mode switch 59 can switch between the automatic mode M1 in which clutch control is automatically performed and the manual mode M2 in which clutch control is manually performed according to the operation of the clutch lever 4b under predetermined conditions. For example, the clutch control mode switch 59 is provided in a handle switch which is attached to the steering handlebar 4a. Accordingly, an occupant can easily operate the clutch control mode switch 59 at the time of normal operation.

<Control Mode of Clutch-by-Wire System>

FIG. 7 is a diagram showing an example of the control mode of the clutch-by-wire system.

As shown in FIG. 7, the clutch-by-wire system includes an automatic mode and a manual mode. The clutch-by-wire system is set to switch between the automatic mode and the manual mode. The switching between the automatic mode and the manual mode is performed by operating a mode switch (not shown) at the time of stopping of the vehicle or at the neutral gear position. In FIG. 7, "starting" denotes the starting time of the vehicle, "speed changing" denotes the speed changing time during traveling of the vehicle, "stopping" denotes the stopping time of the vehicle after being decelerated, and "lever" denotes the clutch lever 4b (see FIG. 4).

In the automatic mode, basically, the vehicle can travel without the clutch lever 4b being operated. In the automatic mode, the clutch can also be arbitrarily disengaged by grasping the clutch lever 4b. In the automatic mode, since engine stop avoidance control is provided, the engine is not stopped by operating the clutch lever.

In the automatic mode at the time of starting of the vehicle, the vehicle can be automatically started while avoiding engine stop simply with a throttle operation without grasping the clutch lever 4b. In the automatic mode at the time of starting of the vehicle, a manual operation can also be temporarily intervened. For example, in the automatic mode at the time of starting of the vehicle, manual starting is possible while avoiding engine stop.

In the automatic mode at the time of speed changing during travel of the vehicle, basically speed changing is possible simply with a shift operation, and automatic clutch control intervention is performed at the time of shift operation. In the automatic mode at the time of speed changing during travel of the vehicle, the manual operation can also be temporarily intervened. For example, in the automatic mode at the time of speed changing during travel of the vehicle, manual speed changing is possible to while avoiding engine stop.

In the automatic mode at the time of stopping of the vehicle after being decelerated, a clutch-off state is automatically started. In the automatic mode at the time of stopping of the vehicle after being decelerated, a manual operation can also be temporarily intervened. For example, in the automatic mode at the time of stopping of the vehicle after being decelerated, clutch-off is possible by the manual operation.

The manual mode basically employs the manual operation, and clutch control intervention is performed only at the time of speed changing. The manual mode does not employ engine stop avoidance control and thus engine stop may be caused depending on the clutch lever operation.

In the manual mode at the time of starting of the vehicle, manual starting using the clutch lever operation and the throttle operation is possible. In the manual mode, automatic starting using only the throttle operation is not possible.

Basically, in the manual mode at the time of speed changing during travel of the vehicle, manual speed changing using the clutch lever operation and the shift operation is possible. Speed changing using only the shift operation is possible without the clutch lever being operated. In this case, clutch control intervention is performed.

In the manual mode at the time of stopping of the vehicle after being decelerated, the clutch-off state is started by the manual operation. For example, in the manual mode at the time of stopping of the vehicle after being decelerated, the clutch is switched to the disengaged state by the clutch lever operation, the gear position of the transmission is switched to the in-gear state of the first gear stage by the shift operation, and then switched from the first gear stage to the neutral state.

In the manual mode at the time of stopping of the vehicle after being decelerated, when the shift operation is performed without the clutch lever being operated, a driver's mode misrecognition may be considered to have occurred and mode misrecognition notification control which will be described later may be intervened. For example, when it is determined that mode misrecognition has occurred in the manual mode, the ECU 60 issues an engine stop signal.

<Clutch Control in Automatic Mode>

Figure 8:
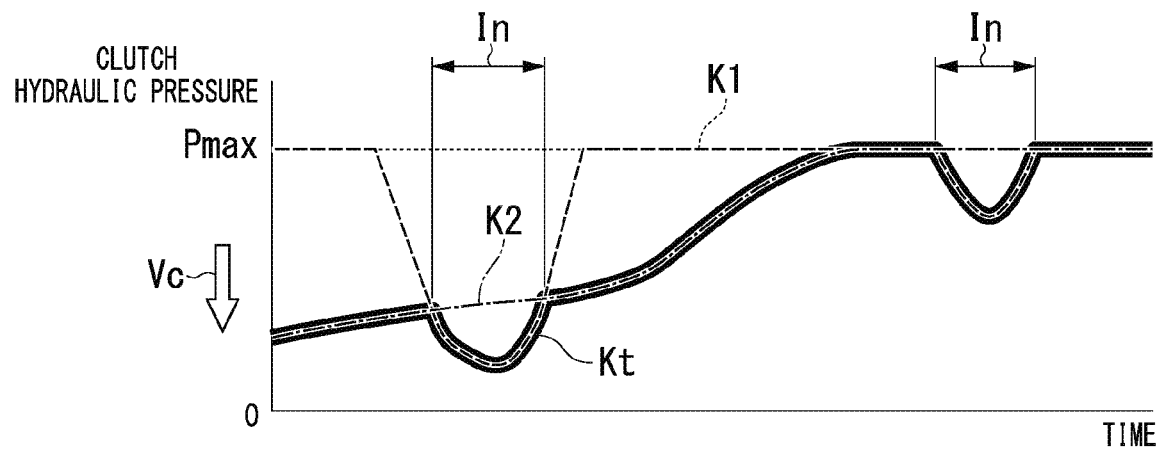
FIG. 8 is a diagram showing an example of clutch control in an automatic mode according to the embodiment.

FIG. 8 is a diagram showing an example of clutch control in the automatic mode according to the embodiment. In FIG. 8, the horizontal axis represents the time, and the vertical axis represents the clutch hydraulic pressure. In FIG. 8, reference sign K1 denotes a target clutch hydraulic pressure based on a clutch lever operation, reference sign K2 denotes a target clutch hydraulic pressure based on automatic control, reference signal Kt denotes a target clutch hydraulic pressure, reference sign P max denotes a maximum clutch-engagement hydraulic pressure, the direction of arrow Vc denotes a clutch disengagement direction, and reference sign In denotes an intervention range (an intervention range of a manual operation).

As shown in FIG. 8, in the automatic mode, the lower of the target clutch hydraulic pressure K2 based on automatic control and the target clutch hydraulic pressure K1 based on the clutch lever operation is selected and set as the target clutch hydraulic pressure Kt. That is, in the automatic mode, clutch control is performed by selecting the lower target hydraulic pressure of the automatic side and the manual side. Accordingly, it is possible to start the vehicle without stopping the engine simply with the throttle operation. By grasping the clutch lever 4b, the clutch may be arbitrarily disengaged.

<Clutch Control in Manual Mode>

Figure 9:
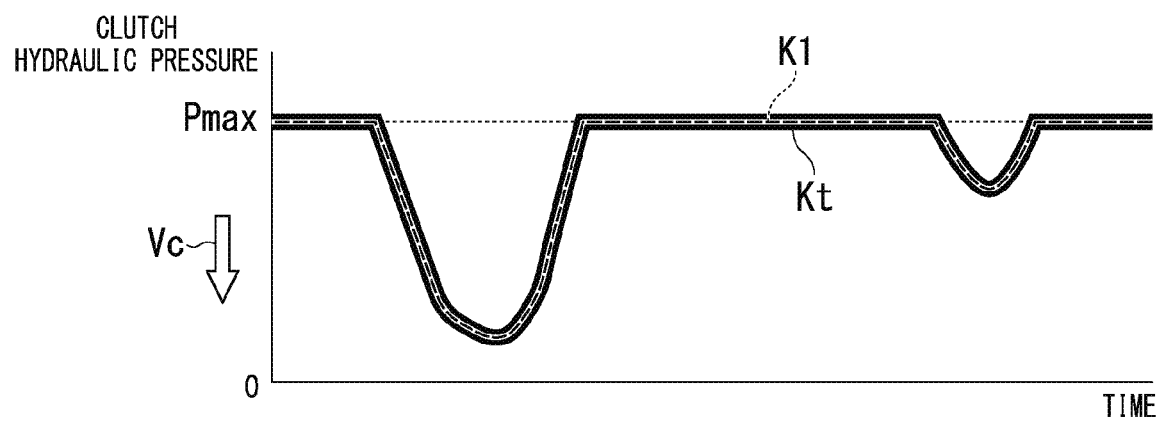
FIG. 9 is a diagram showing an example of clutch control in a manual mode according to the embodiment.

FIG. 9 is a diagram showing an example of clutch control in the manual mode according to the embodiment. In FIG. 9, the horizontal axis represents the time, and the vertical axis represents the clutch hydraulic pressure. In FIG. 9, reference sign K1 denotes a target clutch hydraulic pressure based on the clutch lever operation, reference sign Kt denotes a target clutch hydraulic pressure, reference sign P max denotes a maximum clutch-engagement hydraulic pressure, and the direction of arrow Vc denotes a clutch disengagement direction.

As shown in FIG. 9, in the manual mode, the target clutch hydraulic pressure K2 based on the clutch lever operation is selected and set as the target clutch hydraulic pressure Kt. That is, in the manual mode, the clutch hydraulic pressure can be controlled according to an operation angle of the clutch lever 4b. Accordingly, it is possible to control engagement and disengagement of the clutch according to an occupant's intention. The motorcycle can travel with the clutch engaged even at a very low speed corresponding to idling.

<Mode Misrecognition Notification Control>

The speed changing system (the speed changing device) according to this embodiment includes the manual mode in which the motorcycle starts, stops, and changes the speed with the operation of the clutch lever 4b (see FIG. 4) and the automatic mode in which the motorcycle starts, stops, and changes the speed without the operation of the clutch lever 4b. The speed changing system can change setting of the manual mode and the automatic mode. The speed changing system includes the ECU 60 (the control unit) that notifies of mode misrecognition when it is determined that mode misrecognition has occurred.

An example of a process flow which is performed by the ECU 60 at the time of mode misrecognition notification control will be described below with reference to the flowchart shown in FIG. 10. This control flow is repeatedly performed with a prescribed control cycle (1 msec to 10 msec).

Figure 10:
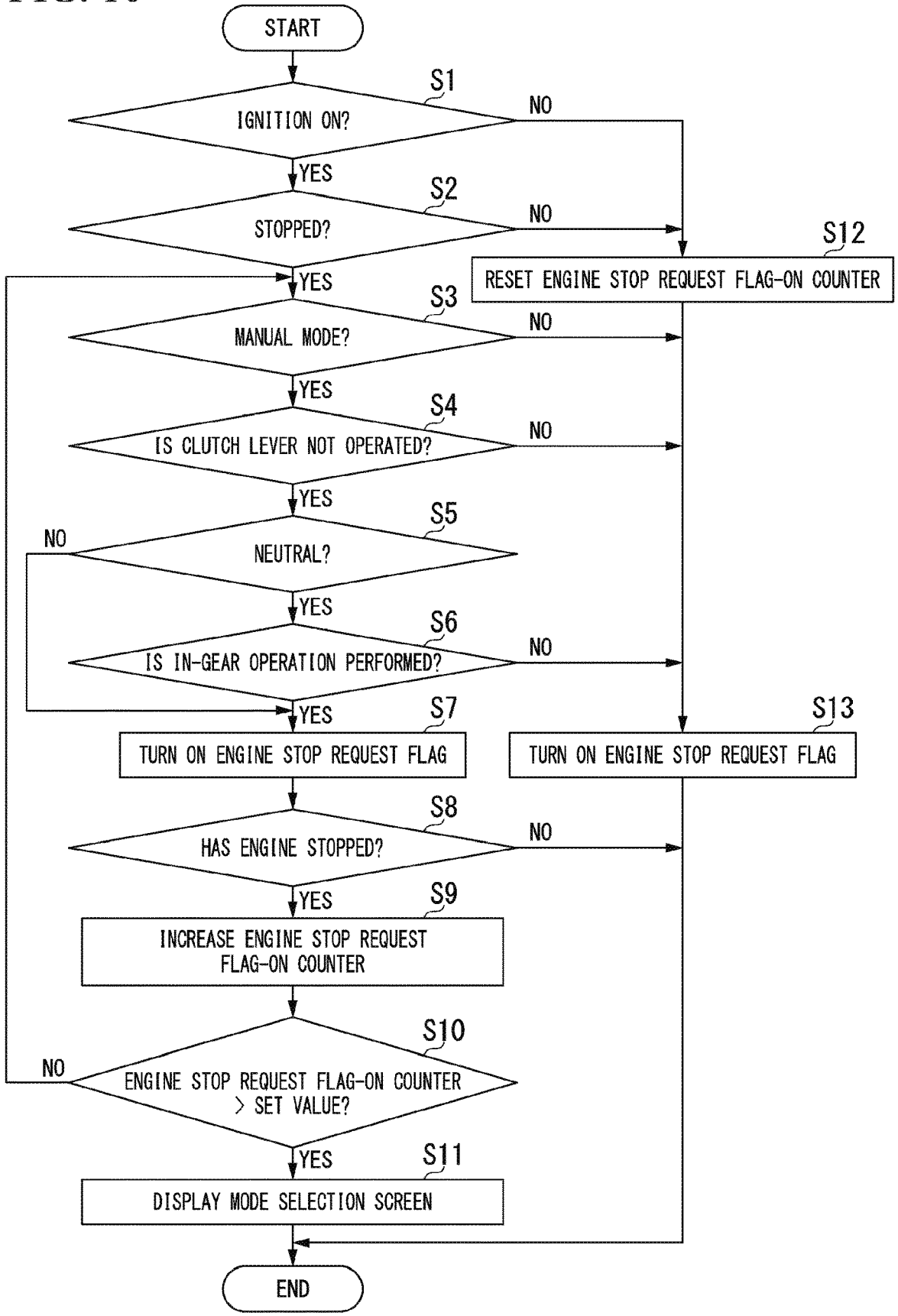
FIG. 10 is a flowchart showing mode misrecognition notification control according to the embodiment.

As shown in FIG. 10, the ECU 60 determines whether an ignition is on (Step S1). In Step S1, the ECU 60 determines whether the engine stops.

When the determination result of Step S1 is YES (the ignition is on and the engine does not stop), the control flow transitions to Step S2.

On the other hand, when the determination result of Step S1 is NO (the ignition is off and the engine stops), the control flow transitions to Step S12.

In Step S2, the ECU 60 determines whether the motorcycle is in a stopped state. Here, the stopped state includes a state in which the vehicle speed is less than a set value corresponding to stopping. That is, the stopped state includes a state in which in which the motorcycle is going to stop after being decelerated and a state in which the motorcycle is going to start in the state in which the motorcycle stops completely. In this embodiment, it is determined whether the result of detection (the vehicle speed) from the vehicle speed sensor 75 (see FIG. 4) is less than a predetermined value (hereinafter also referred to as a "vehicle-speed threshold value"). For example, the vehicle-speed threshold value is set to 1 km/h.

When the determination result of Step S2 is YES (the stopped state), the control flow transitions to Step S3. In this embodiment, when the vehicle speed is less than the vehicle-speed threshold value (for example, 1 km/h), the control flow transitions to Step S3.

On the other hand, when the determination result of Step S2 is NO (the motorcycle is not in the stopped state but is traveling), the control flow transitions to Step S12.

In Step S3, the ECU 60 determines whether the operation mode is the manual mode. In Step S3, the ECU 60 determines whether the operation mode is set to the manual mode or the automatic mode.

When the determination result of Step S3 is YES (the operation mode is set to the manual mode), the control flow transitions to Step S4.

On the other hand, when the determination result of Step S3 is NO (the operation mode is not set to the manual mode but to the automatic mode), the control flow transitions to Step S13.

In Step S4, the ECU 60 determines whether the clutch lever operation is not performed. In Step S4, the ECU 60 determines whether the clutch lever 4b is not grasped and is in the clutch engaged state or whether the clutch lever 4b is grasped and is in the clutch-off state (the disengaged state).

When the determination result of Step S4 is YES (the clutch-engaged state), the control flow transitions to Step S5.

On the other hand, when the determination result of Step S4 is NO (the clutch-off state), the control flow transitions to Step S13.

In Step S5, the ECU 60 determines whether the gear position is located at the neutral stage. In Step S5, the ECU 60 determines whether the gear position is located at the neutral stage or whether the gear position is located at a gear stage other than the neutral stage.

When the determination result of Step S5 is YES (the gear position is located at the neutral stage), the control flow transitions to Step S6.

On the other hand, when the determination result of Step S5 is YES (the gear position is located at a gear stage other than the neutral stage), the control flow transitions to Step S7.

In Step S6, the ECU 60 determines whether an in-gear operation has performed. In Step S6, the ECU 60 determines whether an operation to a gear stage other than the neutral stage has been performed in the state in which the gear position is located at the neutral stage.

When the determination result of Step S6 is YES (the in-gear operation has performed), the control flow transitions to Step S7.

On the other hand, when the determination result of Step S6 is NO (the in-gear operation has not been performed), the control flow transitions to Step S13.

In Step S7, the ECU 60 determines that an engine stop request flag is on. Here, the engine stop request flag-on means that a flag for requesting an engine stop signal is turned on.

In this embodiment, the engine stop request flag-on is determined by satisfying the conditions that the gear position is located in a gear stage other than the neutral stage (NO in Step S5) or that the in-gear operation has performed (YES in Step S6) on the premise that the ignition is on (YES in Step S1), the motorcycle is in the stopped state (YES in Step S2), the operation mode is the manual mode (YES in Step S3), and the clutch is in the engaged state (YES in Step S4).

In this embodiment, the ECU 60 notifies of mode misrecognition by issuing a signal for stopping the engine of the vehicle (hereinafter also referred to as an "engine stop signal"). For example, the engine stop signal includes a signal for performing ignition cut or fuel injection cut.

In this embodiment, the ECU 60 notifies of mode misrecognition by stopping the vehicle.

In this embodiment, the ECU 60 determines that mode misrecognition has occurred only when it is determined that the vehicle speed is less than a predetermined value. When the shift operation has been performed without the clutch lever 4b being operated in the state in which the manual mode is set, the ECU 60 determines that mode misrecognition has occurred.

After Step S7, the control flow transitions to Step S8.

In Step S8, the ECU 60 determines whether the engine has stopped (engine stop).

When the determination result of Step S8 is YES (the engine has stopped), the control flow transitions to Step S9.

On the other hand, when the determination result of Step S8 is NO (the engine has not stopped), the control flow ends.

In Step S9, the ECU 60 calculates an engine stop request flag-on counter. For example, when it is repeatedly determined that the engine stop request flag is on, the ECU 60 calculates the number of determinations.

After Step S9, the control flow transitions to Step S10.

In Step S10, the ECU 60 determines whether the engine stop request flag-on counter is greater than a set value (hereinafter also referred to as a "counter threshold value"). Here, the engine stop request flag-on counter means that the number of determinations of engine stop request flag-on by the ECU 60. For example, the counter threshold value is set to three.

When the determination result of Step S10 is YES (the engine stop request flag-on counter is greater than the set value), the control flow transitions to Step S11.

On the other hand, when the determination result of Step S10 is NO (the engine stop request flag-on counter is equal to or less than the set value), the control flow returns to Step S3.

In Step S11, the ECU 60 displays a mode selection screen. In this embodiment, when it is repeatedly determined that mode misrecognition has occurred, the ECU 60 notifies of mode misrecognition using a means other than stopping the vehicle. For example, the other means includes changing a blinking cycle of an indicator.

For example, the indicator is provided in a display device (for example, a meter) on which setting information of various modes is displayed. For example, the ECU 60 may signal mode misrecognition by shortening the blinking cycle of the indicator in comparison with that in the normal state.

In Step S12, the ECU 60 resets the engine stop request flag-on counter. For example, when the ignition is off (NO in Step S1) or the vehicle is traveling (NO in Step S2), the ECU 60 sets the number of determinations of engine stop request flag-on to zero.

In Step S13, the ECU 60 determines that the engine stop request flag is off. Here, the engine stop request flag-off means that the flag for requesting the engine stop signal is not turned on. In this embodiment, the engine stop request flag-off is determined by satisfying any one condition of conditions that the ignition is off (NO in Step S1), the vehicle is traveling (NO in Step S2), the operation mode is the automatic mode (NO in Step S3), the clutch is in the disengaged state (NO in Step S4), and the in-gear operation has not been performed (NO in Step S6).

As described above, the embodiment employs the ECU 60 that includes the manual mode in which the clutch is engaged and disengaged by operating the clutch lever 4b and the automatic mode in which the clutch is engaged and disengaged without the clutch lever 4b being operated, can switch between the manual mode and the automatic mode, and notifies of mode misrecognition when it is determined that mode misrecognition has occurred.

With this configuration, when it is determined that mode misrecognition has occurred, a driver can be actively notified of mode misrecognition even using the ECU 60 that notifies of mode misrecognition when the driver does not recognize a current mode. Accordingly, it is possible to cause the driver to recognize mode misrecognition before starting.

In the above embodiment, since the ECU 60 notifies of mode misrecognition by stopping the vehicle, it is possible to allow a driver to more reliably recognize that mode misrecognition has occurred. Since the operation of stopping the vehicle is performed under the control, it is possible to relax a shock at the time of stopping in comparison with a case in which the operation of stopping the vehicle is performed mechanically.

In the above embodiment, since the ECU 60 notifies of mode misrecognition by issuing an engine stop signal, it is possible to allow a driver to more reliably recognize that mode misrecognition has occurred.

In the above embodiment, since the ECU 60 determines that mode misrecognition has occurred when the shift operation is performed without the clutch lever 4b being operated in a state in which the manual mode is set, the following advantages are achieved. Since a driver can recognize mode misrecognition when the manual mode is set, it is possible to avoid an erroneous operation when the manual mode is set. For example, even when the driver does not recognize that the manual mode is set, it is possible to cause the driver to recognize the mode by semi-forcibly causing the driver to select the mode through notification of mode misrecognition.

In the above embodiment, since the ECU 60 determines that mode misrecognition has occurred only when it is determined that the vehicle speed is equal to or lower than the predetermined value, the time at which a driver is allowed to recognize mode misrecognition can be limited to a time at which it is determined that the vehicle speed is equal to or lower than the predetermined value.

In the above embodiment, since the ECU 60 notifies of mode misrecognition using a means other than stopping the vehicle when it is repeatedly determined that mode misrecognition has occurred, it is possible to cause a driver to recognize mode misrecognition even at the time of stopping of the vehicle.

In the above embodiment, since the other means includes changing the blinking cycle of the indicator, the following advantages are achieved. By allowing a driver to recognize change of the blinking cycle of the indicator, it is possible to cause the driver to more reliably recognize that mode misrecognition has occurred.

The manual mode is classified into an ease mode and an expert mode depending on an amount of operation of the clutch lever 4b. Here, the ease mode is a mode in which the clutch can be switched to the clutch-off state (the disengaged state) only when the amount of operation of the clutch lever 4b is greater than a predetermined value. On the other hand, the expert mode is a mode in which the clutch can be switched to the clutch-off state when the amount of operation of the clutch lever 4b is slightly less than a predetermined value (less than an amount of displacement in the ease mode).

For example, the ECU 60 may determine that mode misrecognition has occurred when the shift operation is performed without the clutch lever 4b being operated in a state in which the expert mode is set. Accordingly, since a driver can recognize mode misrecognition when the expert mode is set, it is possible to avoid an erroneous operation when the expert mode is set. For example, even when a driver does not recognize that the expert mode is set, it is possible to cause the driver to recognize the mode by semi-forcibly causing the driver to select the mode through notification of mode misrecognition.

The present invention is not limited to the above embodiment. That is, the present invention is not limited to the configuration in which the clutch is engaged with an increase in hydraulic pressure and the clutch is disengaged with a decrease in hydraulic pressure, but may employ, for example, a configuration in which the clutch is disengaged with an increase in hydraulic pressure and the clutch is engaged with a decrease in hydraulic pressure.

The clutch operator is not limited to the clutch lever, but may employ a clutch pedal or other various operators.

In the above embodiment, an example in which the control unit is integrated with the ECU (an example in which the ECU includes the hydraulic pressure control unit) has been described, but the present invention is not limited thereto. For example, the control unit may be separated from the ECU. For example, the speed changing device may include a hydraulic pressure control unit separated from the ECU. In this case, mode misrecognition may be determined by the hydraulic pressure control unit and the engine stop signal may be issued from the ECU.

The invention is not limited to application to a straddle type vehicle in which the clutch operation is automated as in the above embodiment, but can also be applied to a straddle type vehicle including a speed changing device without requiring a clutch operation in which a manual clutch operation is basically used and speed changing is possible by adjusting a drive force without performing a manual clutch operation under predetermined conditions.

Examples of the straddle type vehicle include all vehicles which a driver straddles over a vehicle body, also includes vehicles with three wheels (including a vehicle with a front wheel and two rear wheels and a vehicle with a two front wheels and a rear wheel) or four wheels in addition to a motorcycle (including a bicycle with a motor and a scooter type vehicle), and also includes a vehicle including an electric motor as a motor.

The configuration of the above embodiment is an example of the invention and can be modified in various forms without departing from the gist of the invention.

BRIEF DESCRIPTION OF THE REFERENCE SYMBOLS

1 Motorcycle (straddle type vehicle, vehicle)
4b Clutch lever
13 Engine
60 ECU (control unit)

What is claimed is:

1. A speed changing device comprising a control unit that:
    has a manual mode in which a clutch is engaged and disengaged by operating a clutch lever and an automatic mode in which the clutch is engaged and disengaged without the clutch lever being operated and is able to change a setting to the manual mode and the automatic mode; and
    is configured to signal a mode of misrecognition when it is determined that mode misrecognition has occurred, wherein the control unit is configured to determine that the mode misrecognition has occurred only when a shift operation is performed without the clutch lever being operated in a state in which the manual mode is set and it is determined that a vehicle speed is equal to or lower than a predetermined value.

2. The speed changing device according to claim 1, wherein the control unit is configured to signal the mode misrecognition by stopping a vehicle.

3. The speed changing device according to claim 2, wherein the control unit is configured to signal the mode misrecognition by issuing a signal for stopping an engine of the vehicle.

4. The speed changing device according to claim 1, wherein the control unit is configured to signal the mode misrecognition by issuing a signal for stopping an engine of the vehicle.

5. The speed changing device according to claim 1, wherein the control unit is configured to signal the mode misrecognition using another means other than stopping the vehicle when it is repeatedly determined that the mode misrecognition has occurred.

6. The speed changing device according to claim 5, wherein the other means is a means that is configured to change a blinking cycle of an indicator.

\* \* \* \* \*